Dec. 20, 1960  R. B. LOEWENTHAL  2,965,144
TAPERED ROUTER BIT AND METHOD
Filed Oct. 29, 1957
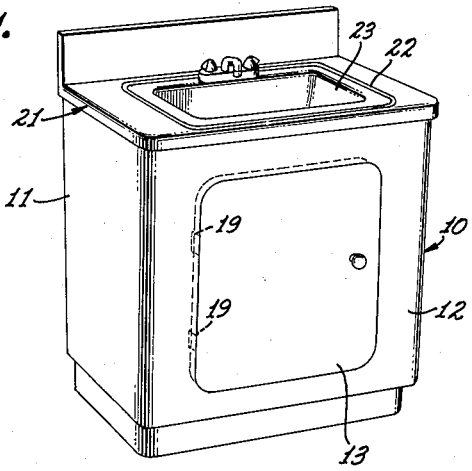
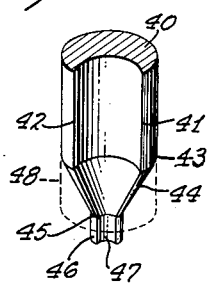
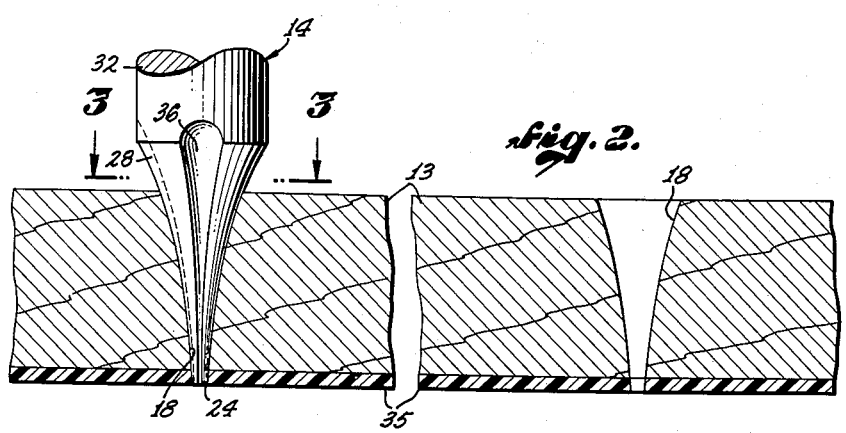
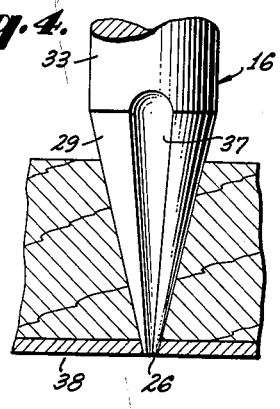
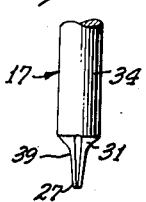
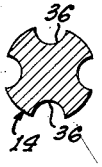
ROBERT B. LOEWENTHAL,
INVENTOR.
HERZIG & JESSUP,
ATTORNEYS.
BY

United States Patent Office 2,965,144
Patented Dec. 20, 1960

2,965,144

TAPERED ROUTER BIT AND METHOD

Robert B. Loewenthal, 1947 Prosser Ave.,
Los Angeles, Calif.

Filed Oct. 29, 1957, Ser. No. 693,082

1 Claim. (Cl. 144—323)

This invention relates to making cut-outs from flat materials, such as panels, and particularly to their use as doors, drawers, and the like, in furniture and cabinet making.

In the manufacture of furniture, cabinets, and the like, a problem is presented in forming, cutting and fitting doors, drawers, and the like, especially in the case of furniture made with a wood or composition panel having a resinous, plastic, or the like surface material adhered to its outer surface.

Any router sufficiently large in diameter to cut through the panel leaves too large a cut-out border between the would-be door and the rest of the cabinet—i.e., the material removed in the cut is excessive. Thus, the cut-out part desired for a door or drawer face cannot be used for such and would be discarded.

In the practice of this invention, a router of generally tapered form is used so that the base thereof, which is of relatively greater strength and diameter than its tip, is used to cut away the reinforcing backing material of the panel (ordinarily about ¾ inch plywood), and the relatively smaller diametered end of the router simultaneously cuts through and along the resinous formica or the like surfacing material or laminate. Thereby the back of the panel, which is normally hidden from view in use, is given a wide cut corresponding to the base of the router or cutter, of the order of one-half to three-eighths of an inch, for example; whereas the cut visible from the front side of the panel is preferably of the order of approximately one-sixteenth of an inch and therefore within the limits of permissible visible clearance normally expected in art-worthy furniture and fixtures insofar as their drawer or door construction is concerned.

It is an important object of this invention to provide a new and improved means and method for rapidly and efficiently cutting doors and drawers, or the like, out of flat materials in a manner so that there is a minimum amount of wastage of material and consumption of time and labor. The face frame and door, or drawer, are thereby fabricated in a single cutting operation.

Another object is to provide a new and improved means and method for making usable cut-outs in furniture and cabinet making where the component or single panels are provided with a hard surface layer on one side thereof.

A further object is to provide a new and improved means and method for reducing costly and time-consuming fitting and finishing operations by cutting around a pre-formed jig or pattern laid as a guide on the back surface of a subject panel.

The doors or drawers herein sometimes referred to as cut-outs are formed by routing through the panel from the back side, so that the routing out slot is formed with walls converging from the back side towards the front side. The resulting cut-outs are usable for closing the corresponding door or drawer opening.

Further objects and purposes will appear from the detailed description of preferred embodiments of my invention given with reference to the drawings wherein:

Figure 1 is a perspective view of a one-piece sink cabinet wherein the door and the sink opening were routed out by using the method and apparatus of my invention;

Figure 2 is a cross-sectional view showing a concavely tapered routing tool and the outline of a routing slot formed by the method and apparatus of my invention through a wooden panel having a resin or plastic surface coating layer;

Figure 3 is a partial cross-sectional view taken on the line 3—3 of Figure 2, showing a preferred shape of the cutting blades of the router tool;

Figure 4 is a view similar to that of Figures 2, showing a straight tapered routing tool employed to cut a routing slot through a wooden panel having a metallized or other hardened surface coating layer attached thereto;

Figure 5 is a side elevational view showing a routing tool converging from the shank thereof to the tip thereof in two stages; and Figure 6 is a fragmentary perspective view of a router tool converging or stepped only adjacent its smaller tip portion.

In the embodiment of the invention shown in Figure 1, the sink cabinet 10 is pre-fabricated by making the sides 11 and the front wall 12, and leaving the back side and top open. The side walls 11 and front wall 12 can be made at an angle to the vertical, or they can be made vertical, depending upon the styling and design desired. A door 13 is, in any event, routed out by the use of a routing tool such as one of the types 14, 16 or 17 shown in Figures 2 to 5, or described, by applying the tool from the back of the panel, as shown in Figure 2. A continuous slot 18 is routed out around the border of the pattern having walls converging from the rear of the front wall toward the protective surface layer on the wooden or other type of panel, such as one made of composition or laminated materials, for example. The door shape can be readily traced around a correspondingly shaped template, not shown, applied to the back of the panel.

The converging slot thus formed produces enough clearance so that the door thus routed out can be hung on the front wall of the cabinet in the opening cut out by the router. The door hinges 19 can be mounted either on the inside or the outside of the front wall 12. A drawer face is cut in the same manner but the hinges 19 are omitted and a drawer body is added. All cut-outs are most conveniently made when the panel is flat.

The sink top 21 is pre-fabricated into the desired shape and the sink hole 22 cut to accommodate a sink 23 in conventional fashion.

The tip 24, 26 or 27 of the router tool employed is formed with any number of blades 28, 29 or 31, respectively, converging in one manner or another from the shank 32, 33 or 34, respectively, of the router bit to the tip thereof. Satisfactory routers can be made with one or two flutes. That illustrated in Figure 3 has four only, by way of example.

In Figure 2 said router bit is shown with a cylindrical shank 32 and cutting blades 28 formed in the bit converging concavely from the shank to the tip 24 of the bit. The blades 28 are fluted with the cutting edges projecting outwardly to cut material and direct the cuttings into a groove 36. The sides of the groove 36 converge outwardly from the tip to the shank of the tool so that the bulk of cuttings may move upwardly through the groove, whereas most of the cuttings or shavings of the surface layer material 35, such as formica, veneer or sheet metal, drop through the slot 18 from the grooves 36 of the bit at the tip. Thus the cuttings do not interfere with the smooth routing out of the slot, and tearing, burring or defacing of the surface coating material is prevented. Instead of having the cutting blades of the router bit straight inclined or concavely tapered from the shank to the tip of the bit, the blades can be convexly inclined from the shank to the tip of the bit. But in any event, it is to be noted that a router bit of sufficient diameter and strength to cut through the usual panel will leave an unsightly cut at the front of the panel unless the tip is reduced as shown and described for the front cut.

Figure 4 shows another routing bit 16 wherein the blades 29 and grooves 37 are straight tapered from the shank 33 of the tool to the tip 26. In this embodiment also, the cutting blades 29 extend outwardly somewhat beyond the radii of the other portions of the tool bit so that the blades can cut into the wood or other panel material and into the surface coating layer. In this embodiment is shown a surface layer 38 of formica, metallized material, or the like. As described above, the metallized or hard cuttings generally drop through the formed portion of the slot and do not interfere with the smooth cutting of the slot.

Figure 5 shows another embodiment of the router bit, wherein most of the tapering takes place from the shank 34 to a small diameter bit portion 39, and from that point on the bit is tapered only slightly or not at all to the tip 27 of the tool. The tool of Figure 5 is found especially useful in flat material or paneling of relatively small thickness. Also, if desired, the approximate diameter of the shank 34 can be extended to approximately the tip 27 and there be sharply curved or even stepped down to a short reduced tip 27 which need be no longer than the thickness of the layer 35, 38, as may be required by the thickness of the material, the desired result, and other variables.

Such a stepped or sharply tapered bit is shown in Figure 6, and comprises a main enlarged body portion 40 preferably having a single cutting edge 41 and trailing edge 42. A shoulder 43 starts a taper 44 which terminates at a reduced shoulder 45. A reduced cutting tip 46, adapted to cut through the hard surface layer of the panel as heretofore described, is provided with a cutting edge 47 effectively continuous with the cutting edge 41, which also extends through the tapered part 44. As shown in dotted outline at 48, the taper 44 may be eliminated and the tip 46 formed by a step-down configuration of the bit. The single cutting edge 41 may be used in any of the preceding embodiments in lieu of the multiple cutting edges therein shown and/or described.

It will be seen that the method of this invention is much more efficient and economical than methods requiring framing, fitting, finishing, sanding, etc., and involving wastage of the cut-outs. Moreover, it is possible by this invention to make almost any shaped opening and cut-out therefor which match one another and which would be impractical to make by any other means or method.

While I have herein shown and described my invention in what I have conceived to be the most practical and preferred embodiments, it is recognized that departures can be made therefrom within the scope of my invention, which is not to be limited to the details disclosed herein, but is to be accorded the full scope of the claim so as to embrace any and all equivalent structures.

Having described my invention, what I claim as new and desire to secure by Letters Patent is:

The method of forming closure panel cut-outs from a flat sheet of material having a surface layer of a different material on the front face thereof, comprising the steps of: routing a slot through said sheet from the rear face thereof, controlling the width of said slot so that it is of substantial width at said rear face and converges from said rear face to said front face, controlling the depth of said slot so that its width at said front face is of the order of about one-sixteenth inch, and routing said slot to the desired outline of said closure panel.

References Cited in the file of this patent

UNITED STATES PATENTS

| Number | Name | Date |
|---|---|---|
| 66,354 | Keables | July 2, 1867 |
| 86,293 | Forbis | Jan. 26, 1869 |
| 330,259 | Olund | Nov. 10, 1885 |
| 245,739 | Merklen | Aug. 16, 1881 |
| 616,118 | Kuhne | Dec. 20, 1898 |
| 740,506 | Winquist | Oct. 6, 1903 |
| 1,273,043 | Densmore | July 16, 1918 |
| 1,519,876 | Phelps | Dec. 16, 1924 |
| 1,614,967 | Peck | Jan. 18, 1927 |
| 1,770,925 | Howe | July 22, 1930 |
| 1,939,999 | Madsen | Dec. 19, 1933 |
| 1,963,611 | Brumell et al. | June 19, 1934 |
| 2,311,361 | Beil | Feb. 16, 1943 |
| 2,528,300 | Degner | Oct. 31, 1950 |
| 2,652,866 | Drain | Sept. 22, 1953 |
| 2,780,966 | Frost et al. | Feb. 12, 1957 |
| 2,819,743 | Birkel et al. | Jan. 14, 1958 |